F. GRANGER.
MACHINE FOR RAKING AND COCKING HAY.
No. 60,880. Patented Jan. 1, 1867.
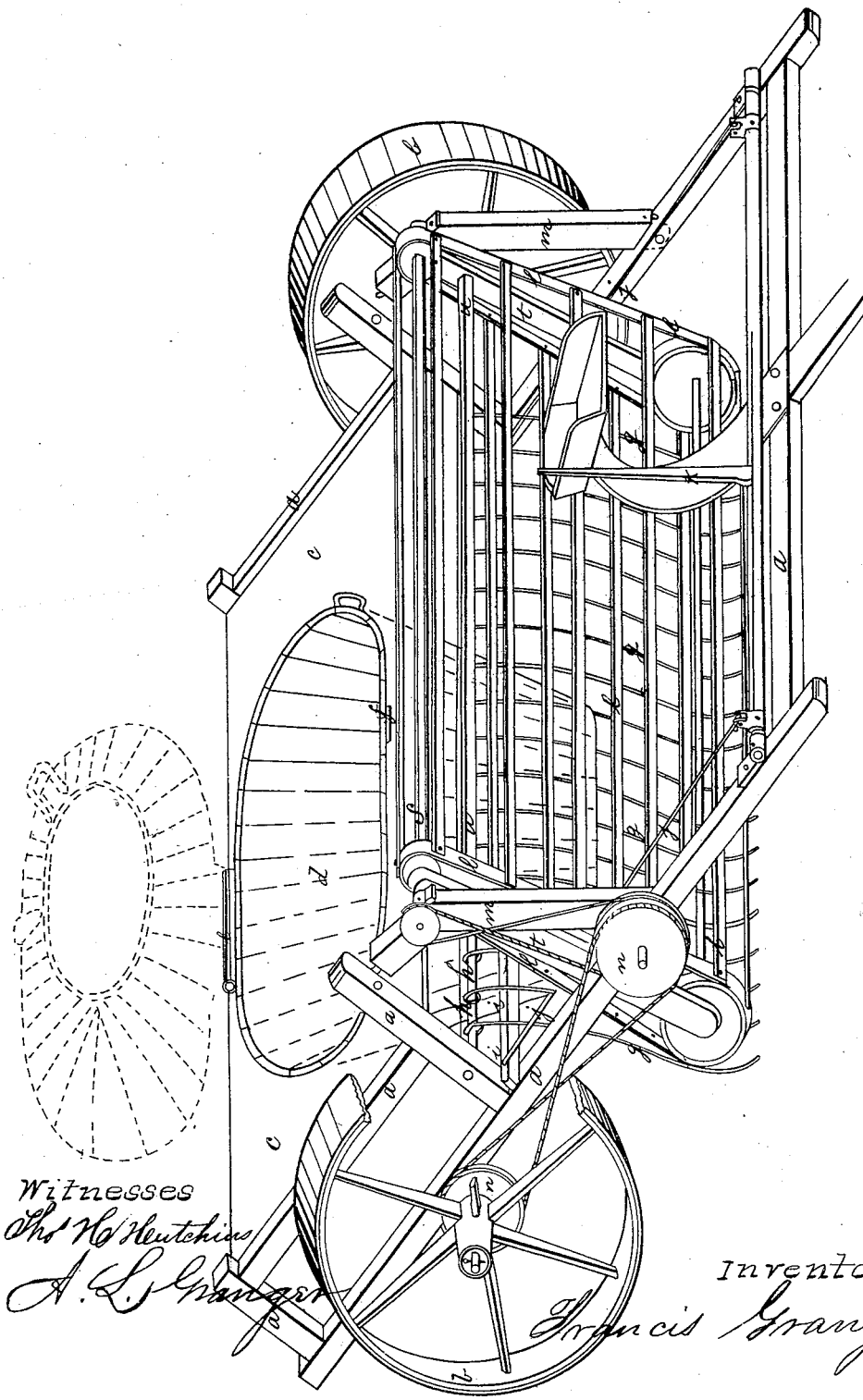
Witnesses
Thos. H. Hutchins
A. L. Granger
Inventor.
Francis Granger.

United States Patent Office.

FRANCIS GRANGER, OF HOMER, ILLINOIS.

Letters Patent No. 60,880, dated January 1, 1867.

---

IMPROVEMENT IN MACHINES FOR RAKING AND COCKING HAY.

---

The Schedule referred to in these Letters Patent and making part of the same.

---

Be it known that I, FRANCIS GRANGER, of the town of Homer, in Will county, and State of Illinois, have invented a new and useful Improvement on a Horse Hay Rake and Cocker; and I do hereby declare that the following is a full, clear, and exact description of the construction and operation of the same, reference being had to the annexed drawings, making a part of this specification.

The object and nature of my invention consist in the arrangement of certain devices to gather or rake up hay from the ground, deposit the same in a receiver of the size required for an ordinary cock of hay, which, when full, is inverted by the operator, and the hay deposited on the ground in the rear of the rake in the form of a cock, as the machine travels over the field.

To enable others skilled in the art to make and use my invention, I will proceed to describe its construction and operation.

$a$ represents the main frame furnished at the sides with the travelling-wheels $b$, and also the platform $c$, in which hangs the receiver $d$, fastened to said platform by the hinge $e$ at the back, and resting on the stop $f$ at the front, as well as on the edge of the orifice in the platform in which it hangs. $g$ represents the rake teeth attached to the main frame by the rod $h$, behind which teeth is placed the elevating-bar $i$, attached at the outer ends to the connecting-rods $j$, and operated by the lever $k$, for the purpose of elevating the teeth to pass from field to field or over obstructions. $l$ represents a double adjustable elevator, hanging in the adjustable frame $m$, which is attached by a hinged joint at the lower ends to the main frame, so as to give a sort of reciprocating motion to the upper ends, in which hangs the elevator, to allow it to accommodate itself to the quantity of hay on the rake. The frame on which the elevator operates hangs suspended on the shaft $s$, resting on the frame $m$, at the upper end; said elevator frame being constructed with a cross-head, $t$, at either end, with cross-bars, $u$, running from one to the other to keep them in their proper position. The elevator is made to revolve by the sheaves $n$, from the travelling-wheel, and which said elevator, by the power of its own gravity pressing the hay against the rake, carries the hay up along the teeth as it is gathered and deposits the same on the platform $c$, and from thence the hay is raked into said receiver by the operator, who stands therein, packing the hay by his own weight, and who, when said receiver is full, inverts the same, which drops the hay in the rear of the rake in the form of a cock.

Claim.

What I claim as my invention, and desire to secure by Letters Patent, is—

The elevator $l$, carrying by its own gravity the hay up the rake teeth $g$, in combination with the rake $g\ h$, the adjustable frame $m$, and the hinged receiver $d$, substantially as described.

FRANCIS GRANGER.

Witnesses:
THOS. H. HUTCHINS,
F. H. KAFFER.